Patented June 5, 1934

1,961,675

UNITED STATES PATENT OFFICE

1,961,675

PACKING AND PROCESS OF MAKING SAME

Paul F. Schade, Berlin, Germany, assignor to Chemieprodukte G. m. b. H., Berlin, Germany No Drawing. Application June 7, 1930, Serial No. 459,834. In Germany February 6, 1930

12 Claims. (Cl. 91—68)

This invention relates to novel wrappers or packings for protecting metal bodies, such as gas or water-pipes, electric cables or the like against corrosion and similar destruction, and more particularly wrappers or packings of the kind described in my copending two applications for patent Serial No. 232,713, filed November 11th, 1927 and Serial No. 338,052, filed February 6th, 1929.

According to the aforementioned applications for patent I provide a plastical protective wrapper or packing for underground pipes or cables, said wrapper or packing consisting essentially of a core of texture or paper impregnated with a special, permanently plastical mass.

The process forming part of my present invention consists in providing wrappers or packings of the kind forming the subject matter of my aforementioned two applications for patent having the aforementioned core in the form of a rope or ropes or cords which may consist of any desired material, such as for instance hemp or jute, that is ordinary ropes or cords obtainable on the market.

The plastical mass applied to a core having the form of a rope or ropes or cords may, for instance, be made according to my invention from residues gained from a process of distillation of mineral oils, such as protoparaffine, soft bitumen and eventually indifferent substances which are non-conductors of the electric current, such as porcelain earth, said residues being treated under exclusion of any moisture.

The plastical mass now is applied according to my invention to the core which is of the form of a rope or ropes or cords, for instance, in such a way that said plastical mass is transformed by heat into a relatively liquid mass and by passing the rope or cord through a bath of such a liquid mass with the effect that the rope or cord will be thoroughly soaked and impregnated with said mass. Any excess of the plastical mass, that is, that part of the mass which is not absorbed by the core may eventually be skimmed off the surface of the latter by the aid of proper auxiliaries, thus securing, in addition to the impregnation, a uniform distribution of the plastical mass over the entire surface of the core. The process of soaking or impregnating said core with the plastical mass and the process of skimming off the excess of mass from the surface of the core may repeatedly be applied, if this should be found desirable.

A core soaked or impregnated with the plastical mass may be employed preferably for purposes of insulating electric cables or for making packings or wrappers for underground pipes. Especially in those cases where heretofore tarred hemp ropes or ordinary white ropes had been used the wrapper or packing made according to my present invention may be more successfully employed. Cables, pipes or the like may thus be perfectly tightened at the point of introduction into the cellars or basements of houses permitting the proper cable or pipe connection to be made. Cables as known are introduced into the houses with the aid of a relatively short piece of pipe which is inserted into the wall of the basement. This mode of introducing cables, however, is connected with grave disadvantages which consist essentially in the danger of leakage which may take place at the points where said cables are tightened against said pipes or the like, this leakage resulting into escape of gas or water in case of rupture of a pipe. This escaping gas or water may now enter the cellar of the house through said piece of pipe and give rise to explosion, gas poisoning or similar troubles. Leakages of this kind and the consequent escape of gas or water, as well known, have frequently resulted in destructions of the street and destructions of other kind of which recently quite a large number has become known in several countries.

Leakages of the aforementioned kind and the consequent escape of gas or water from the pipe system now may be positively prevented by providing a proper and absolutely effective packing at the point of introduction of the cable or pipe and between the cable or pipe on one hand and the walls of houses on the other hand. All attempts heretofore made to provide a proper packing for cables or pipes at the points of introduction into houses have been rather unsuccessful on account of the fact that the ordinarily used tightening substances, such as cement, clay, tarred ropes, masses that are applied by a casting process, red-lead, lacquer, varnish or the like also in connection with a carrier or core in the form of a rope or cord have the inherent disadvantage of becoming hard and brittle after some time and are therefore liable to break or crack due to vibrations such as are produced to an ever increasing extent by the modern automobile traffic.

These disadvantages which are inherent to cable or pipe packings of the ordinary kind are fully and most successfully avoided by my present invention according to which a rope, ropes or cords are provided as a core for a permanently plastical packing or tightening material. According to my invention, the cables, pipes or the like, more particularly, are provided with a wrapper or packing which consists of a rope, ropes or cords, soaked or impregnated with permanently plastical material at or preferably somewhat in front of the points at which said cables or pipes are introduced into the houses, and more especially, into the inlet pipes, potheads or the like. Furthermore, according to my invention, the wrapper or packing having a core in the form of a rope or cords with a permanently plastical mass is applied to the cable or pipe in such a manner that it will completely fill up the space intermediate the cable or pipe on the one hand and the pothead or inlet pipe on the other hand.

As material for the core of my present packing or wrapper I prefer to use especially thin ropes or cords of hemp, jute, silk or the like which are impregnated or soaked in the above described manner with the permanently plastical mass and thereupon twisted into a unitary rope, cob, lap or the like. A wrapper made in this manner now may be treated much like putty or mastic permitting to provide a most effective packing which permanently retains its plasticity and in addition to this will be absolutely impervious to gas as well as to liquids. By my invention therefore, I have provided a novel, extremely valuable wrapper or packing for gas and water-pipes, electric cables or the like which fully complies with all modern requirements, especially as regards vibrations which as above mentioned are produced by modern traffic to an ever increasing extent on the streets of cities and even on country roads.

I claim:

1. A corrosion-proof, electrically insulating and continually plastic packing or tightening material, consisting of a cord or rope impregnated and covered with a mixture of soft bitumen and such a chemically inert product of earth-oil distillation as contains proto-paraffine.

2. A corrosion-proof, electrically insulating and continually plastic packing or tightening material consisting of a cord or rope impregnated and covered with a mixture of soft bitumen, an indifferent filling substance, and such a chemically inert product of earth-oil distillation as contains protoparaffine.

3. A corrosion-proof, electrically insulating and continually plastic packing or tightening material consisting of a cord or rope impregnated and covered with a mixture of soft bitumen, petroleum jelly and such a chemically inert product of earth-oil distillation as contains protoparaffine.

4. A corrosion-proof, electrically insulating and continually plastic packing or tightening material, consisting of a plurality of cords or ropes twisted together and impregnated individually with a mixture of soft bitumen and such a chemically inert product of earth-oil distillation as contains protoparaffine.

5. A corrosion-proof, electrically insulating and continually plastic packing or tightening material, consisting of a plurality of cords or ropes twisted together and impregnated individually with a mixture of soft bitumen, an indifferent filling substance, and such a chemically inert product of earth-oil distillation as contains protoparaffine.

6. A corrosion-proof, electrically insulating and continually plastic packing or tightening material, consisting of a plurality of cords or ropes twisted together and impregnated individually with a mixture of soft bitumen, petroleum jelly and such a chemically inert product of earth-oil distillation as contains protoparaffine.

7. The method of manufacturing a corrosion-proof electrically insulating and continually plastic packing and tightening material, consisting in impregnating and covering a cord or rope with a mixture composed of from 20 to 40 parts of soft bitumen and such an amount of a chemically inert product of earth-oil distillation containing protoparaffine that this latter substance amounts to from 30 to 50 parts.

8. The method of manufacturing a corrosion-proof, electrically insulating and continually plastic packing and tightening material, consisting in impregnating and covering a cord or rope with a mixture composed of from 20 to 40 parts of soft bitumen having a fusing point up to 40° C., and such an amount of a chemically inert product of earth-oil distillation containing protoparaffine having a fusing point of 53° C. that this latter substance amounts to from 30 to 50 parts.

9. The method of manufacturing a corrosion-proof, electrically insulating and continually plastic packing and tightening material, consisting in impregnating and covering a cord or rope with a mixture composed of from 20 to 40 parts of soft bitumen, up to 5 parts of petroleum jelly, and such an amount of a chemically inert product of earth-oil distillation containing protoparaffine that this latter substance amounts to from 30 to 50 parts.

10. The method of manufacturing a corrosion-proof, electrically insulating and continually plastic packing and tightening material, consisting in impregnating and covering a cord or rope with a mixture composed of from 20 to 40 parts of soft bitumen having a fusing point up to 40° C., up to 5 parts of petroleum jelly having a fusing point up to 30° C., and such an amount of a chemically inert product of earth-oil distillation containing protoparaffine having a fusing point of 53° C. that this latter substance amounts to from 30 to 50 parts.

11. The method of manufacturing a corrosion-proof, electrically insulating and continually plastic packing and tightening material, consisting in impregnating and covering a cord or rope with a mixture composed of from 20 to 40 parts of soft bitumen, such an amount of a chemically inert product of earth-oil distillation containing protoparaffine that this latter substance amounts to from 30 to 50 parts and from 40 to 60 parts of a finely pulverized mineral substance.

12. The method of manufacturing a corrosion-proof, electrically insulating and continually plastic packing and tightening material, consisting in impregnating and covering a cord or rope with a mixture composed of 15 parts of soft bitumen, 40 parts of protoparaffine, 5 parts of earth-oil jelly, 30 parts of kaolin, and 10 parts of kieselgur.

PAUL F. SCHADE.